(12) United States Patent
Weitzel et al.

(10) Patent No.: US 12,017,621 B2
(45) Date of Patent: Jun. 25, 2024

(54) HEATED CLEANING DEVICE

(71) Applicant: Continental Automotive GmbH, Hannover (DE)

(72) Inventors: Heiko Weitzel, Schenklengsfeld-Hilmes (DE); Andreas Rehs, Rotenburg a. d. Fulda (DE); Stefan Schäckel, Bad Hersfeld (DE); Reiner Krauße, Herleshausen-Willershausen (DE)

(73) Assignee: Continental Automotive GmbH, Hannover (DE)

( * ) Notice: Subject to any disclaimer, the term of this patent is extended or adjusted under 35 U.S.C. 154(b) by 407 days.

(21) Appl. No.: 17/312,354

(22) PCT Filed: Dec. 4, 2019

(86) PCT No.: PCT/EP2019/083727
§ 371 (c)(1),
(2) Date: Jun. 9, 2021

(87) PCT Pub. No.: WO2020/120264
PCT Pub. Date: Jun. 18, 2020

(65) Prior Publication Data
US 2022/0048476 A1 Feb. 17, 2022

(30) Foreign Application Priority Data
Dec. 10, 2018 (DE) .................... 10 2018 221 354.2

(51) Int. Cl.
*B60S 1/48* (2006.01)
*B60S 1/52* (2006.01)
(Continued)

(52) U.S. Cl.
CPC ................. *B60S 1/52* (2013.01); *B60S 1/487* (2013.01); *B60S 1/488* (2013.01); *F24H 1/009* (2013.01); *F24H 1/102* (2013.01); *F24H 1/103* (2013.01)

(58) Field of Classification Search
None
See application file for complete search history.

(56) References Cited

U.S. PATENT DOCUMENTS

| 5,522,453 A | 6/1996 | Green |
| 7,093,317 B1 | 8/2006 | Zimmer |

(Continued)

FOREIGN PATENT DOCUMENTS

| CN | 1754073 A | 3/2006 |
| CN | 1997858 A | 7/2007 |

(Continued)

OTHER PUBLICATIONS

Search Report dated Nov. 26, 2019 from corresponding German Patent Application No. DE 10 2018 221 354.2.

(Continued)

*Primary Examiner* — Levon J Shahinian

(57) ABSTRACT

Disclosed is a cleaning device for a washing apparatus arranged in a vehicle, comprising a housing with a chamber which is formed in the housing, is configured to be filled with cleaning fluid and is hydraulically connectable to at least one spray nozzle for the cleaning fluid, and with at least one heatable heating wire protruding at least in sections into the chamber. To obtain high functional reliability even at low temperatures and to permit particularly rapid and reliable deicing, a heat-conducting element is arranged in the chamber to enlarge a heat-transferring convection surface, said heat-conducting element absorbing the heat from the (Continued)

heating wire, and being at least partially, and preferably completely, surrounded by the cleaning fluid.

17 Claims, 3 Drawing Sheets

(51) Int. Cl.
*F24H 1/00* (2022.01)
*F24H 1/10* (2022.01)

(56) References Cited

U.S. PATENT DOCUMENTS

| | | |
|---|---|---|
| 2003/0222156 A1 | 12/2003 | Bissonnette |
| 2004/0170411 A1 | 9/2004 | Kuebler et al. |
| 2004/0170412 A1 | 9/2004 | Kuebler et al. |
| 2005/0019028 A1 | 1/2005 | Kuebler et al. |
| 2009/0179084 A1 | 7/2009 | Hofmann et al. |
| 2018/0142818 A1 | 5/2018 | Zimmer et al. |
| 2018/0370497 A1 | 12/2018 | Haefner et al. |
| 2020/0164838 A1 | 5/2020 | Bode |

FOREIGN PATENT DOCUMENTS

| | | |
|---|---|---|
| DE | 3324268 A1 | 1/1985 |
| DE | 4426179 A1 | 1/1996 |
| DE | 10242034 A1 | 3/2004 |
| DE | 102004022998 A1 | 12/2005 |
| DE | 102006031713 A1 | 1/2008 |
| DE | 102008003881 A1 | 7/2009 |
| DE | 202010001821 U1 | 6/2011 |
| DE | 202015002874 U1 | 7/2016 |
| DE | 102015215932 A1 | 2/2017 |
| DE | 102015015553 A1 | 6/2017 |
| DE | 102016117673 A1 | 3/2018 |
| DE | 102017114607 A1 | 1/2019 |
| WO | 00/56584 A1 | 9/2000 |

OTHER PUBLICATIONS

International Search Report and Written Opinion dated Feb. 21, 2020 from corresponding International Patent Application No. PCT/EP2019/083727.

Search dated Jan. 19, 2024 from corresponding Chinese patent application No. 201980070762.X.

First Office Action dated Jan. 19, 2024 from corresponding Chinese patent application No. 201980070762.X.

HEATED CLEANING DEVICE

Cleaning devices for a washing apparatus arranged in a vehicle for cleaning windows, headlights, cameras and the like with a cleaning fluid are known. For efficient cleaning of a plurality of remotely located cleaning points and/or large areas, a plurality of such cleaning devices are frequently connected in series within a washing apparatus to a common fluid line and form what are referred to as nozzle chains. At temperatures below the freezing point of the cleaning fluid, freezing can occur, and therefore the ice can clog up the cleaning device or can even destroy it due to its expansion. In order to avoid this, it is known to design the cleaning devices to be heated, in particular by one or more heating wires being guided through the cleaning device and heating the cleaning fluid therein. Reliable and quick deicing to restore permeability is a major challenge.

WO0056584A1 discloses a nozzle chain with a plurality of cleaning devices connected in series by a fluid line. A single heating line is laid through the fluid line and cleaning devices to heat the nozzle chain. This runs through a fluid channel in the housing of the cleaning device, which is used to transport cleaning fluid through the nozzle chain. The fluid channel is connected in the housing of the cleaning device by one or more connecting channels to a chamber which leads directly to a simple mouth opening or to a spherical insert provided with a mouth opening. However, with such a design, the effective deicing of the mouth opening, which is relatively remote from the heating wire, cannot always take place reliably because too low an amount of heat is given off by the heating wire inside the housing.

DE102008003881A1 discloses a cleaning device which is improved in this respect and has an enlarged, cuboid-shaped fluid chamber which is arranged in the housing and is closed by a welded cover. The fluid channel opens in each case into the opposite walls of the fluid chamber. In the center of the bottom of the fluid chamber there is a fluid inlet surrounded by a protruding shoulder and leading to a spray insert. Furthermore, two holding webs are arranged on the bottom of the fluid chamber. A heating wire guided through the fluid channel is guided in meandering form around the holding webs and the shoulder in the fluid chamber, which enables better heating of the nozzle unit.

The assembly process with such laying of the heating wire during manufacturing turns out to be very complex. Furthermore, there is the risk of damaging the insulation of the heating wire by assembly tools or edges on the protruding components.

Furthermore, there is the risk that the housing of such cleaning devices can be burst open by an ice plug formed therein.

The object of the disclosure is therefore to propose an improved heated cleaning device which can be used in a nozzle chain and, while being easier to produce, enables high functional reliability, and quick and reliable deicing, even at low temperatures.

Further embodiments and developments emerge from the dependent claims together with the description.

The invention makes provision for there to be a heat-conducting element with an enlarged heat-emitting surface, for rapid and uniform distribution of the heat in the chamber, which element absorbs the heat from the heating wire and is preferably completely surrounded by cleaning fluid.

As a result, the heating wire can be laid rectilinearly for assembly and manufacturing, while at the same time rapid heating of the cleaning fluid over a large area is nevertheless achieved. The risk of damage to the insulation of the heating wire from assembly tools or edges in the plastics components is significantly lower. The length of the heating wire can be designed to be shorter because there is no need for laying loops.

An even more efficient and rapid heat distribution to functionally significant points of the cleaning device can be achieved, according to the advantageous development of the invention, in that a connecting channel for connecting the chamber to the spray nozzle opens into the chamber and the heat-conducting element surrounds the connecting channel with respect to the longitudinal axis of the connecting channel at least in sections, in particular completely, in the circumferential direction.

A particularly high level of efficiency in terms of manufacturability, handling and the heat-emitting surface can be achieved by a disk-shaped heat-conducting element.

The cleaning device achieves a high level of safety in that a membrane made of an elastomer material is provided in the housing, the membrane hydraulically sealing the chamber from the ambient atmosphere. When the cleaning fluid freezes, the expansion of the ice is compensated for by the elastic deformation of the membrane, thus preventing damage to the housing, which also allows it to be designed with thin walls, which is particularly cost-saving.

For particularly simple production and assembly, the membrane can be clamped in a hydraulically tight manner between the housing and a housing cover fastened to the housing.

The sealing function of the membrane means that the housing cover can also be fastened to the housing by a simple latching connection instead of welding. By avoiding welding, machine costs as well as quality and testing requirements can be reduced significantly.

The functionality of the membrane is effectively maintained in all operating states by the housing cover having at least one ventilation opening for pressure equalization, said ventilation opening producing a pneumatic connection between the ambient atmosphere and the side of the membrane facing away from the chamber.

The efficiency of the cleaning device can be increased through increased functional integration in that the opening point of the connecting channel into the chamber has a sealing edge which can be brought into sealing contact with the membrane and thereby forms a pressure-controlled shut-off valve for shutting off the connecting channel.

A particularly compact construction of the cleaning device and effective heat distribution are promoted by the fact that the connecting channel to the spray nozzle is oriented substantially transversely with respect to the longitudinal axis of the connection piece with the inlet channel running therein for feeding the chamber.

A flexibly adaptive setting of the spray direction is made possible if the housing is pivotably mounted in an outer housing that is fixedly attached to the vehicle. The pivot mounting can be implemented particularly efficiently if the pivot axis is formed concentrically with respect to the longitudinal axis of the connection piece. This is achieved particularly effectively if the connection piece itself forms the pivot axis and for this purpose is clamped into a pivot seat in the outer housing, as a result of which separate pins and the like can be dispensed with.

Effective heat distribution and with production and assembly capability being further simplified is promoted if the chamber is substantially annular around the longitudinal axis of the connecting channel.

A particularly simple and yet effective connection of the heat-conducting element to the heating system is achieved in that the heat-conducting element is configured as an insert and rests only in sections on the heating wire or is mechanically pressed against the latter, with a fixed connection by means of welding, soldering or crimping being dispensed with.

For effective heat conduction and dissipation, the heat-conducting element can be formed from a material with higher thermal conductivity than the material of the housing, in particular from a metal material, preferably from a corrosion-resistant copper alloy or a separately heat-conductively treated plastic, however.

In addition, the invention claims a washing apparatus which, in its construction, contains a cleaning device according to the invention.

The invention will be explained in more detail below with reference to a preferred exemplary embodiment. In the figures.

FIG. 1

Figure 1:
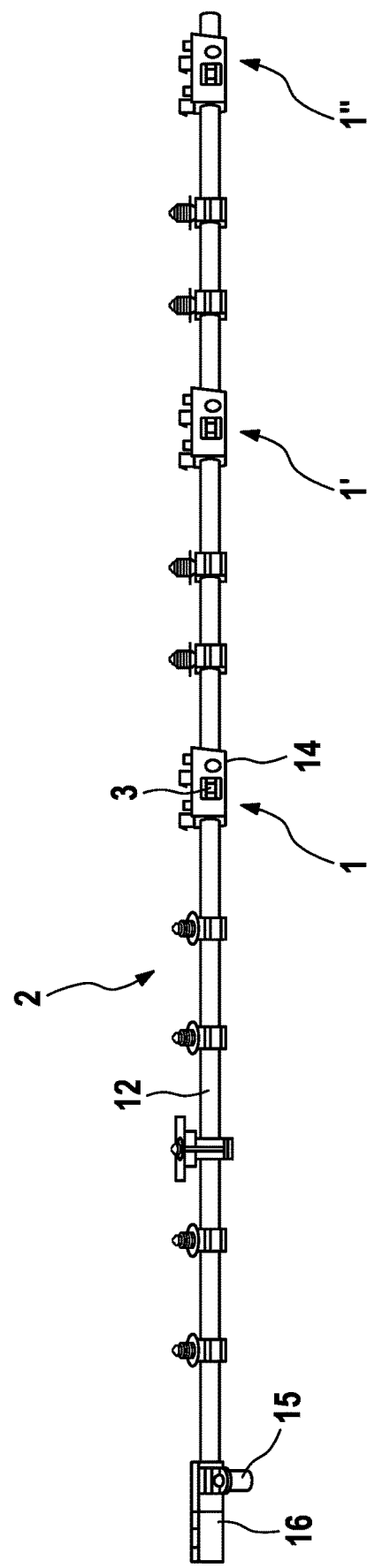
FIG. 1 shows a washing apparatus comprising a nozzle chain with a plurality of series-connected cleaning devices according to the invention.
Figure 2:
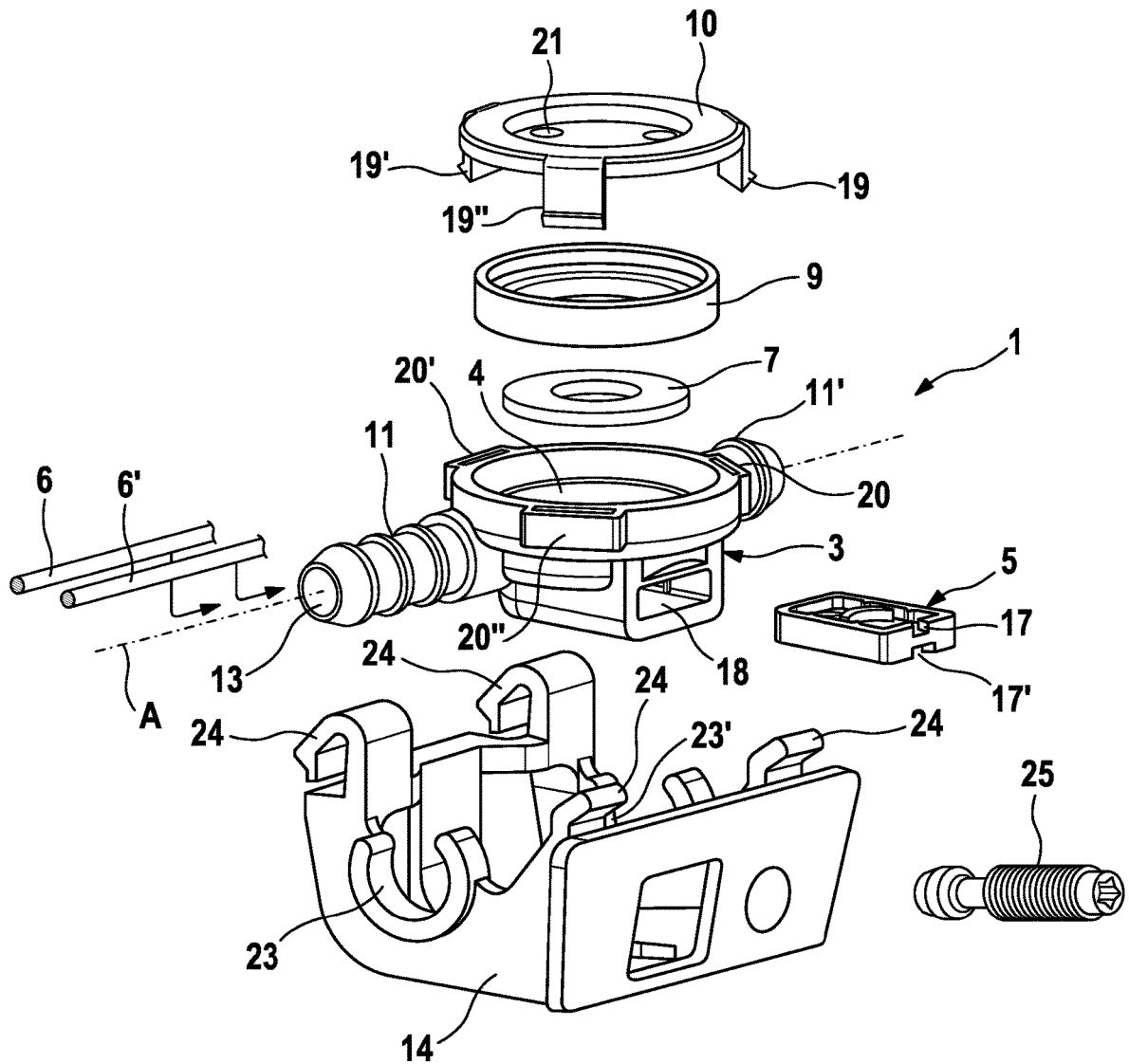
FIG. 2 shows an exploded illustration of a preferred embodiment of the cleaning device.

In FIG. 1, a heated washing apparatus 2 which is constructed as what is referred to as a nozzle chain and is intended for cleaning vehicle windows is illustrated in simplified form and not to scale. A plurality of cleaning devices 1, 1', 1" are connected in series on a common fluid line 12. In the embodiment shown, each of the cleaning devices 1, 1', 1" has an outer housing 14 which is immovably connected to a vehicle part, for example to an add-on part of an engine hood, and a housing 3 which is mounted pivotably in the outer housing 14 and from which a cleaning fluid jet emerges through a window provided in the outer housing 14.

The washing apparatus is supplied with cleaning fluid under pressure from a conveying device (not shown here) via a hydraulic interface 15.

A heating line which is supplied with electric current via an electric interface 16 is laid through the fluid line 12 and the cleaning devices 1, 1', 1". When the electric current supply is activated, the heating line heats up over its entire length and thereby heats the cleaning fluid surrounding it. The heating line is usually laid as a long loop, the two ends of which are connected to the electric interface, such that two individual heating wires run through each cleaning device 1, 1', 1".

According to the invention, deviations in the overall structure and quality of individual components of the washing apparatus 2 are permissible at any time, as long as at least one cleaning device 1 according to the following description is present.

FIG. 2

FIG. 1 shows a preferred embodiment of the cleaning device 1 in an exploded illustration. Two connection pieces 11, 11' for connecting the fluid line 12 are arranged in alignment with one another on a housing 3. A chamber 4 is formed in the housing 3. The chamber is filled with cleaning fluid from an inlet channel 13 running through the connection pieces 11. Heating wires 6, 6' run through the inlet channel 13 and the chamber 4. Via a connecting channel 8 (see FIG. 3) the cleaning fluid is conducted out of the chamber 4 to a spray nozzle 5, where it is ejected from outlet openings 17, 17' onto the surface to be cleaned. In the embodiment shown, the spray nozzle 5 is designed as a cube-shaped insert element, also called a chip, which is received in a receiving seat 18 with a rectangular cross section in the housing 3.

The housing 3 is usually made of a thermoplastic material that is a poor heat conductor, such as polyamide and the like. In order to increase the heat dissipation to the cleaning fluid, a separate heat-conducting element 7, which is a good conductor of heat, is used. The disk-shaped heat-conducting element 7 is placed into the chamber 4 in such a way that it has mechanical contact with the heating wires 6, 6' in some regions and thereby absorbs heat from them. In principle, all materials that are durable in the operating environment and have high thermal conductivity, in particular a metal, are suitable as the material for the heat-conducting element 7. However, plastics with improved heat conductivity can also be used, which can be achieved, for example, by using ceramic, metallic or other suitable fillers.

An elastic membrane 9 inserted into the housing 3 delimits the chamber 4 from the environment. This is pressed in a sealing manner by a housing cover 10. The housing cover is fastened to the housing 3 by latching by means of corresponding latching elements 19, 20. For this purpose, the housing cover 10 has a plurality of tongue-shaped latching elements 19, 19', 19" which are provided with latching hooks and which engage in corresponding eyelet-shaped latching elements 20, 20', 20" on the outer edge of the housing 3, forming an undercut.

In order to set the spray direction, the housing 3 is pivotably mounted in an outer housing 14, which is fixed immovably on a vehicle part by means of fastening elements 24. The connection pieces 11, 11', which are clipped into the corresponding pivot seats 23, 23' in the outer housing 14 for this purpose, serve as the pivot axis.

An adjusting screw 25 acting between the housing 3 and the outer housing 14 is used for the exact setting and permanent maintenance of the pivot position which is set.

FIG. 3

Figure 3:
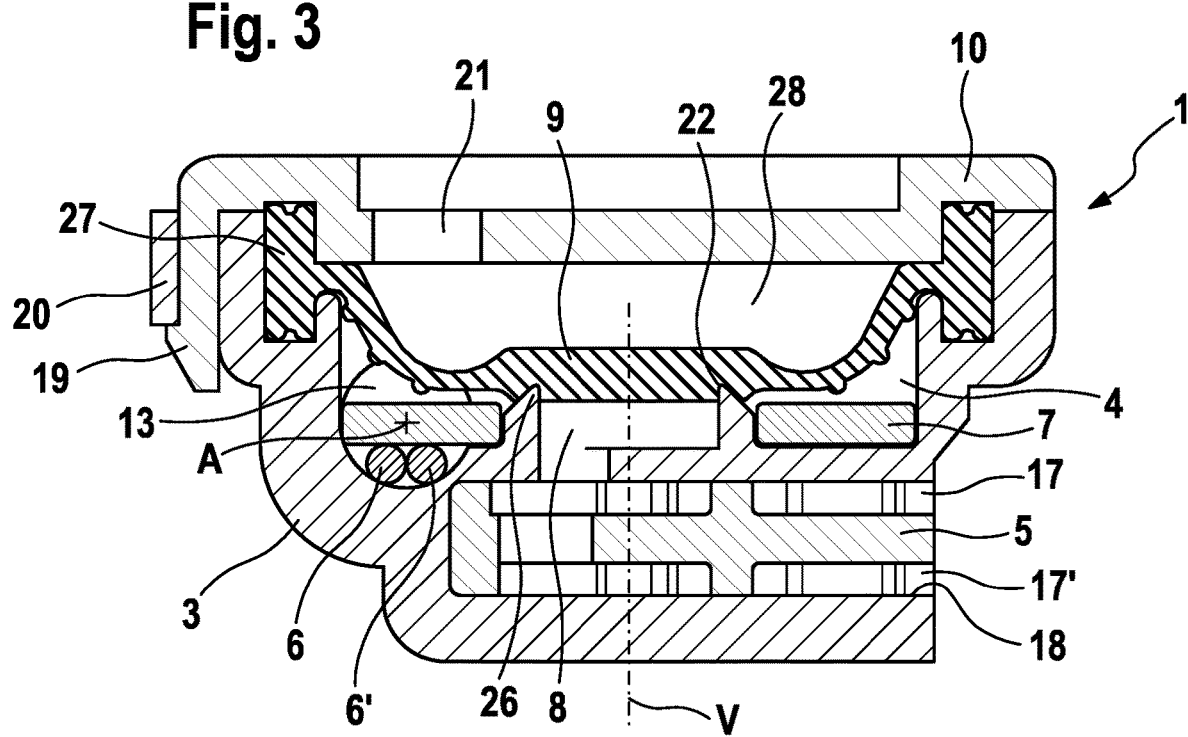
FIG. 3 shows a sectional illustration of the cleaning device transversely with respect to the longitudinal axis of the connection piece.

In FIG. 3, the cleaning device 1 described above is illustrated in a cross-sectional assembly. The outer housing 14 is not shown.

The chamber 4 is arranged substantially annularly around the longitudinal axis V of the centrally arranged connecting channel 8 in the housing 3. The membrane 9 made of an elastomer material is hydraulically tightly clamped between the housing 3 and the housing cover 10 at its sealing bead 27, which is circumferentially formed radially on the outside. A cavity 28 is formed between the housing cover 10 and the membrane 9.

A ventilation opening 21 in the housing cover 10 establishes a pneumatic connection to the cavity 28 and thus between the side of the membrane 9 facing away from the chamber and the ambient atmosphere for the purpose of pressure equalization. This ensures that the membrane 9 can expand and bulge unhindered into the cavity 28, which is the case, for example, when the chamber 4 is filled under pressure with cleaning fluid or when an ice plug is formed by freezing of the cleaning fluid.

The inlet channel 13 with two heating wires 6, 6' laid therein runs through a radial outer region of the chamber 4. The connecting channel 8 is oriented transversely with respect to the longitudinal axis A of the connection piece 11 or of the inlet channel 13 and opens radially centrally into the chamber 4.

The opening point of the connecting channel 8 is surrounded by a circumferential collar 26 which has a sealing edge 22 on the end side. In the unactuated initial state shown here, the membrane 9 lies elastically pretensioned on the sealing edge 22, as a result of which the connecting channel 8 is blocked and a hydraulic connection between the chamber 4 and the spray nozzle 5 is prevented. When the conveying device is activated and the chamber 4 is filled under pressure with cleaning fluid, the membrane 9 bulges and lifts off the sealing edge 22. This unblocks the connecting channel 8, the cleaning fluid passes to the spray nozzle 5 and is expelled from the outlet openings 17, 17'. The membrane 9 thus functions as a valve body and the sealing edge 22 as a valve seat of a pressure-controlled shut-off valve.

The disk-shaped heat-conducting element 7 is located in the chamber 4, where it is surrounded by the cleaning fluid. In the radial center, it completely surrounds the opening point of the connecting channel 8. One edge section protrudes into the inlet channel 13, where it rests on the heating wires 6. The heat is thus conducted from the heating wires into the heat-conducting element 7 by means of a simple mechanical coupling. Due to its good heat-conducting properties, the heat-conducting element 7 heats up quickly and as a whole and releases the heat via its surface to the surrounding cleaning fluid in order to convectively transport it further. As a result, the heat from the heating wires 6, 6' is distributed quickly, over a large area and uniformly throughout the chamber 4. At the same time, the connecting channel 8 and the shut-off valve are also heated.

For better heat conduction, the heat-conducting element 7 can also be mechanically pressed against the heating wires 6, 6', for example by being clamped radially on the outside or inside of the housing 3.

FIG. 4

Figure 4:
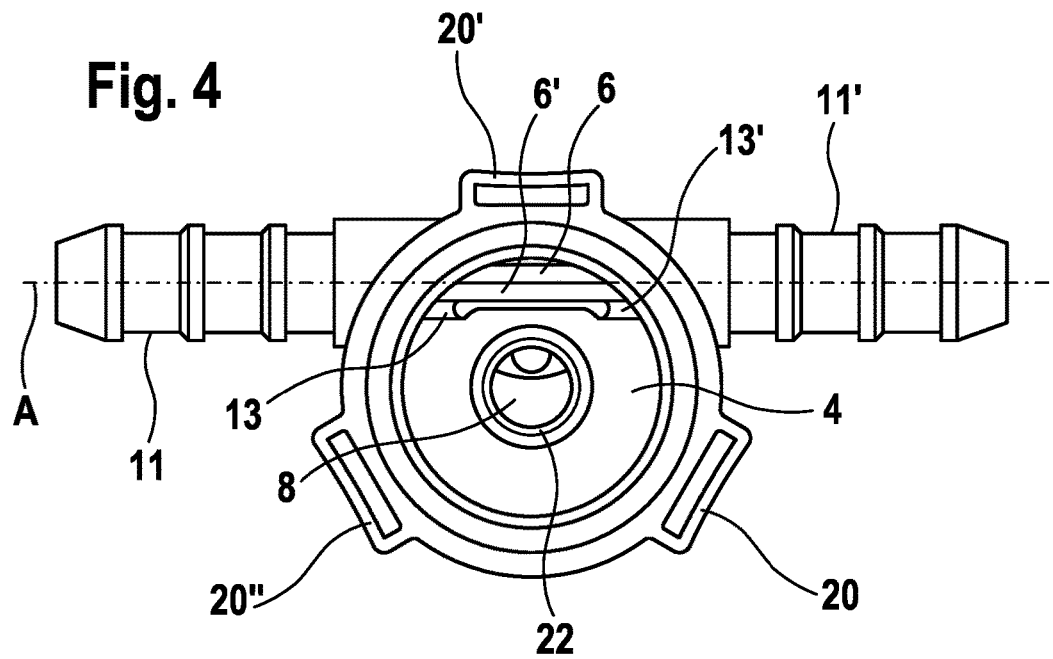
FIG. 4 shows a top view of the housing of the cleaning device, which is not equipped with the exception of the installed heating wire.

To clarify the preferred design of the housing of the cleaning device 1, FIG. 4 shows the housing 3 in a top view.

In its preferred embodiment, the chamber 4 is formed in an aerodynamically annular manner around the radially centered opening point of the connecting channel 8. The two connection pieces 11, 11' are positioned in a radial outer area of the housing 3 such that the inlet channel 13 with the heating wires 6, 6', which are directly laid rectilinearly therein for easy assembly, run only through a radial outer area of the chamber 3.

LIST OF REFERENCE SIGNS

1 Cleaning device
2 Washing apparatus
3 Housing
4 Chamber
5 Spray nozzle
6 Heating wire
7 Heat-conducting element
8 Connecting channel
9 Membrane
10 Housing cover
11 Connection piece
12 Fluid line
13 Inlet channel
14 Outer housing
15 Hydraulic interface
16 Electric interface
17 Outlet opening
18 Receiving seat
19 Latching element
20 Latching element
21 Ventilation opening
22 Sealing edge
23 Pivot seat
24 Fastening element
25 Adjusting screw
26 Collar
27 Sealing bead
28 Cavity
A Longitudinal axis of the connection piece
V Longitudinal axis of the connecting channel

The invention claimed is:

1. A cleaning device for a washing apparatus arranged in a vehicle, comprising:
a housing with a chamber formed in the housing, configured to be filled with cleaning fluid and hydraulically connectable to at least one spray nozzle for the cleaning fluid, and with at least one heatable heating wire protruding at least in sections into the chamber,
wherein a heat-conducting element is arranged in the chamber, the heat-conducting element configured to enlarge a heat-transferring surface, absorb heat from the heating wire, and be at least partially surrounded by the cleaning fluid, and
wherein a membrane made of an elastomer material is arranged in the housing, the membrane delimiting the chamber and hydraulically sealing the chamber from ambient atmosphere.

2. The cleaning device as claimed in claim 1, wherein a connecting channel configured to connect the chamber to the spray nozzle opens into the chamber and the heat-conducting element surrounds the connecting channel with respect to longitudinal axis of the connecting channel at least in sections in circumferential direction.

3. The cleaning device as claimed in claim 2, wherein an opening point of the connecting channel into the chamber has a sealing edge which can be brought into sealing contact with a membrane and thereby forms a pressure-controlled shut-off valve for shutting off the connecting channel.

4. The cleaning device as claimed in claim 2, wherein the housing has at least one connection piece for connecting a fluid line, and the chamber is configured to be filled with cleaning fluid from an inlet channel running through the connection piece, and the connecting channel is oriented substantially transversely with respect to a longitudinal axis of the connection piece.

5. The cleaning device as claimed in claim 4, wherein the housing is pivotably mounted in an outer housing for setting a spray direction, wherein a pivot axis is formed concentrically with respect to the longitudinal axis of the connection piece, in particular the connection piece forms the pivot axis.

6. The cleaning device as claimed in claim 2, wherein the chamber is substantially annular around the longitudinal axis of the connecting channel.

7. The cleaning device as claimed in claim 2 wherein the heat-conducting element surrounds the connecting channel with respect to the longitudinal axis of the connecting channel completely in the circumferential direction.

8. The cleaning device as claimed in claim 1, wherein the heat-conducting element is disk-shaped.

9. The cleaning device as claimed in claim 1, wherein the membrane is clamped in a hydraulically tight manner between the housing and a housing cover fastened to the housing.

10. The cleaning device as claimed in claim 9, wherein the housing cover is fastened to the housing via a latching connection.

11. The cleaning device as claimed in claim 9, wherein the housing cover has at least one ventilation opening for pressure equalization between a side of the membrane facing away from the chamber and the ambient atmosphere.

12. The cleaning device as claimed in claim 1, wherein the heating wire is laid substantially rectilinearly through an edge region of the chamber.

13. The cleaning device as claimed in claim 1, wherein the heat-conducting element is configured to be an insert and rests in sections on the heating wire or is mechanically pressed against the heating wire.

14. The cleaning device as claimed in claim 1, wherein the heat-conducting element is formed from a material with higher thermal conductivity than the material of the housing.

15. The cleaning device as claimed in claim 14, wherein the heat-conducting element is formed from a metal material.

16. A washing apparatus comprising at least one cleaning device as claimed in claim 1.

17. The cleaning device as claimed in claim 1 wherein the heat-conducting element is configured to be completely surrounded by the cleaning fluid.

\* \* \* \* \*